(12) United States Patent
Keith

(10) Patent No.: US 8,953,919 B2
(45) Date of Patent: Feb. 10, 2015

(54) DATACOMMUNICATIONS MODULES, CABLE-CONNECTOR ASSEMBLIES AND COMPONENTS THEREFOR

(75) Inventor: Scott Keith, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 466 days.

(21) Appl. No.: 13/423,521

(22) Filed: Mar. 19, 2012

(65) Prior Publication Data

US 2013/0242506 A1    Sep. 19, 2013

(51) Int. Cl.
 *G02B 6/44* (2006.01)
 *G02B 6/00* (2006.01)

(52) U.S. Cl.
 USPC .......................... 385/135; 385/134; 385/137

(58) Field of Classification Search
 USPC .................... 16/231; 385/135, 137
 See application file for complete search history.

(56) References Cited

U.S. PATENT DOCUMENTS

| 5,212,761 | A  | * | 5/1993 | Petrunia ..................... 385/135 |
| 6,901,200 | B2 | * | 5/2005 | Schray ........................ 385/135 |
| 8,356,728 | B2 | * | 1/2013 | Moore et al. ................. 220/811 |
| 2009/0220204 | A1 | * | 9/2009 | Ruiz ........................... 385/135 |
| 2010/0220967 | A1 | * | 9/2010 | Cooke et al. ................. 385/135 |
| 2010/0322583 | A1 | * | 12/2010 | Cooke et al. ................. 385/135 |
| 2011/0038589 | A1 | * | 2/2011 | Ruiz et al. ................... 385/135 |
| 2011/0129185 | A1 | * | 6/2011 | Lewallen et al. .............. 385/53 |
| 2012/0106911 | A1 | * | 5/2012 | Cooke et al. ................. 385/135 |
| 2012/0134639 | A1 | * | 5/2012 | Giraud et al. ................ 385/135 |
| 2012/0321267 | A1 | * | 12/2012 | Coburn et al. ............... 385/135 |
| 2013/0148936 | A1 | * | 6/2013 | Hill ............................ 385/135 |

* cited by examiner

*Primary Examiner* — Michelle R Connelly
(74) *Attorney, Agent, or Firm* — Myers Bigel Sibley & Sajovec, P.A.

(57) ABSTRACT

A telecommunications module includes: (a) an enclosure having a housing member with a floor and opposed side walls that each has a post that extends inwardly and an upper lip with an outwardly-facing slot; a bezel with a main body and a pair of rearwardly-extending projections, each having an aperture that receives a respective post of the housing side walls, the main body being positioned adjacent a forward edge of the housing floor; and a cover having a ceiling, a rear wall and opposed side walls, each having at least one inwardly-extending finger received in a slot of one of the housing member side walls, the rear wall being positioned adjacent a rear edge of the housing floor; (b) an MPO adapter; (c) a plurality of optical fibers attached to the MPO adapter; and (d) a plurality of caps mounted in the bezels and attached to respective optical fibers.

13 Claims, 7 Drawing Sheets

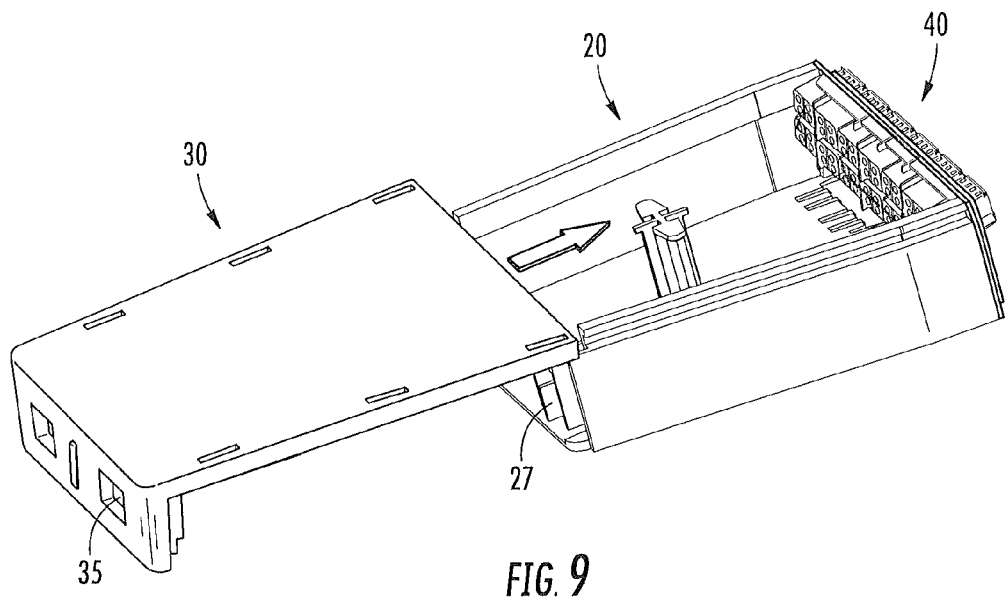
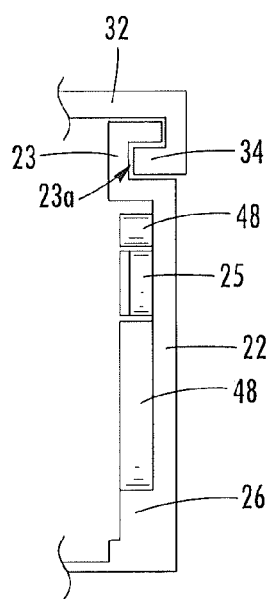
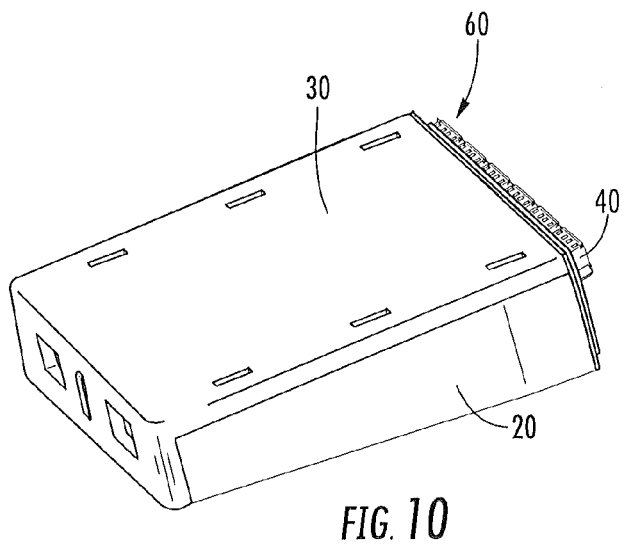
FIG. 9
FIG. 9A
FIG. 10

DATACOMMUNICATIONS MODULES, CABLE-CONNECTOR ASSEMBLIES AND COMPONENTS THEREFOR

FIELD OF THE INVENTION

The present invention relates generally to communications equipment, and more particularly to connectors and cables for communications.

BACKGROUND

A network patching system is typically used to interconnect the various communication lines within a closet, computer room or data center. In a conventional network patching system, the communication lines are terminated within a closet or cabinet in an organized manner via one or more patch panels mounted on a rack or frame. Multiple ports are included in the patch panel, typically in some type of organized array. Each of the different ports may be connected with a communications line. In small patching systems, all communications lines may terminate on the patch panels of the same rack or cabinet. In larger patching systems, multiple racks or cabinets may be used, wherein different communications lines terminate on different racks or cabinets. Interconnections between the various communications lines are made by connecting patch cords to the ports. By selectively connecting the various communications lines with patch cords, any combination of communications lines can be interconnected.

Patch panels and other structures that provide ports for interconnection often have a bezel in which the ports are presented (either as a MPO adapter or a telecommunications jack). The bezel is typically formed of a polymeric material and fits within the panel or a separate housing. In some instances it may be desirable to provide a configuration for a self-contained module with ports similar to those of a patch panel. Such a device may be particularly desirable if the configuration of the bezel facilitates assembly, especially if the panel or housing is to be tamper-proof.

SUMMARY

As a first aspect, embodiments of the present invention are directed to a latch arrangement, comprising: a first component having a floor and opposed side walls that merge with the floor and extend upwardly therefrom, wherein each of the side walls includes a capture stub adjacent the floor that extends inwardly and a post that extends inwardly; and a second component having a main body and a pair of rearwardly-extending projections. Each of the projections includes a recess in its lower edge and an aperture. When assembled the main body is positioned forwardly of the capture stub, the recess receives the capture stub, and the aperture receives the post.

As a second aspect, embodiments of the present invention are directed to an enclosure for a telecommunications system, comprising: a housing member with a floor and opposed side walls that merge with the floor, each of the side walls having a post that extends inwardly and an upper lip with an outwardly-facing slot; a bezel with a main body and a pair of rearwardly-extending projections, each of the rearwardly-extending projections having an aperture that receives a respective post of the housing member side walls, wherein the main body is positioned adjacent a forward edge of the housing floor; and a cover having a ceiling, a rear wall and opposed side walls, each of the opposed side walls having at least one inwardly-extending finger received in a respective slot of one of the housing member side walls, wherein the rear wall is positioned adjacent a rear edge of the housing floor.

As a third aspect, embodiments of the present invention are directed to a telecommunications module, comprising: (a) an enclosure for a telecommunications system, comprising: a housing member with a floor and opposed side walls that merge with the floor, each of the side walls having a post that extends inwardly and an upper lip with an outwardly-facing slot; a bezel with a main body and a pair of rearwardly-extending projections, each of the rearwardly-extending projections having an aperture that receives a respective post of the housing member side walls, wherein the main body is positioned adjacent a forward edge of the housing floor; and a cover having a ceiling, a rear wall and opposed side walls, each of the opposed side walls having at least one inwardly-extending finger received in a respective slot of one of the housing member side walls, wherein the rear wall is positioned adjacent a rear edge of the housing floor; (b) an MPO adapter mounted in the housing; (c) a plurality of optical fibers attached to the MPO adapter; and (d) a plurality of caps mounted in the bezels and attached to respective optical fibers.

BRIEF DESCRIPTION OF THE FIGURES

FIG. 9 is a perspective view of the cover of FIG. 3 being assembled onto the bezel and housing of FIGS. 6-8.

FIG. 9A is a section view of the side walls of the cover and housing and the bezel in an assembled condition.

FIG. 10 is a perspective view of the assembled casing of the module of FIG. 1.

DETAILED DESCRIPTION

Figure 1:
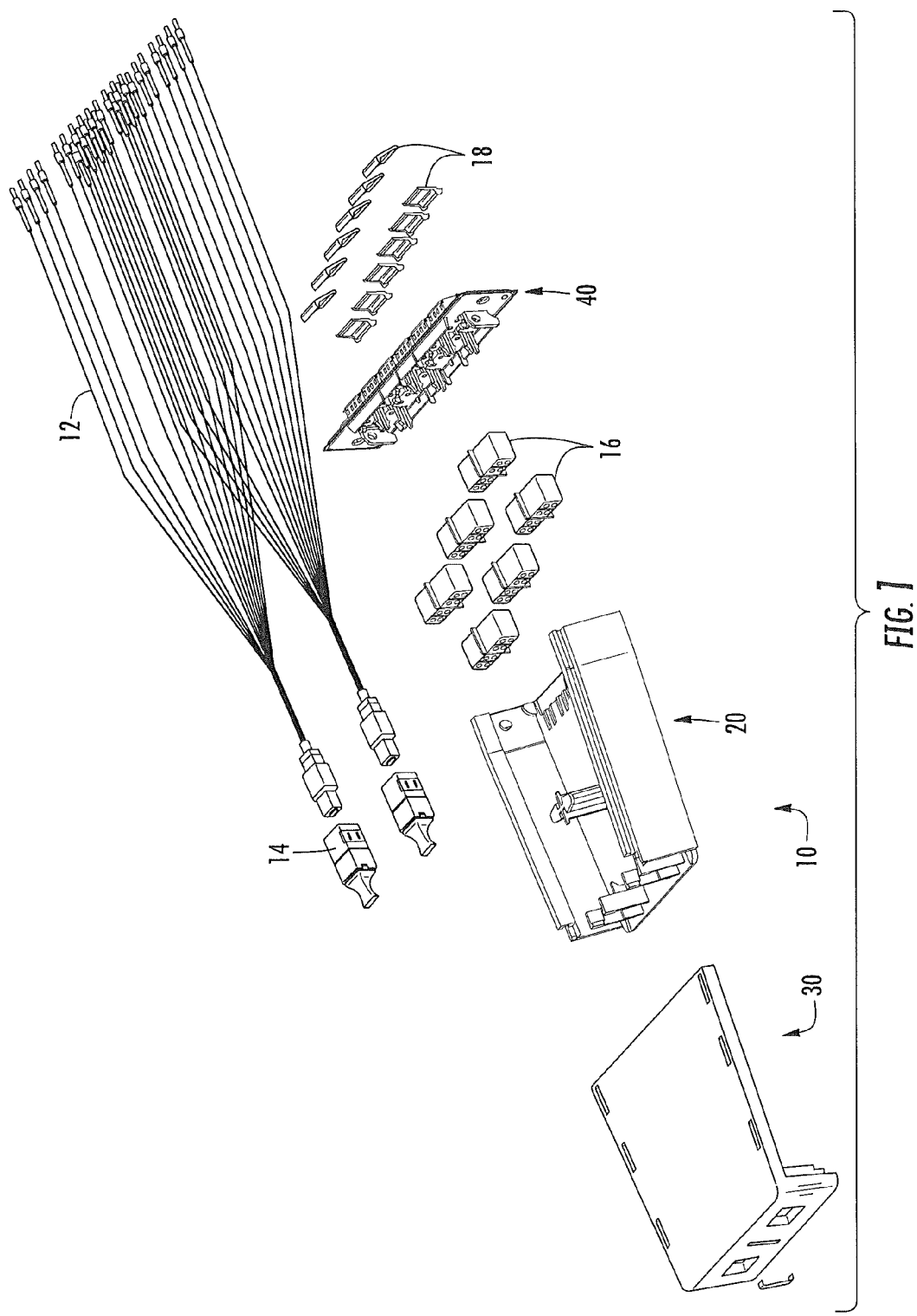
FIG. 1 is an exploded perspective view of an optical fiber patching module according to embodiments of the invention.

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" or "above" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Where used, the terms "attached", "connected", "interconnected", "contacting", "mounted" and the like can mean either direct or indirect attachment or contact between elements, unless stated otherwise.

Turning now to the figures, an optical fiber patching module, designated broadly at 10, is illustrated in FIG. 1. The module 10 includes three main components: a housing 20; a cover 30; and a bezel 40. These are described in detail below.

Figure 2:
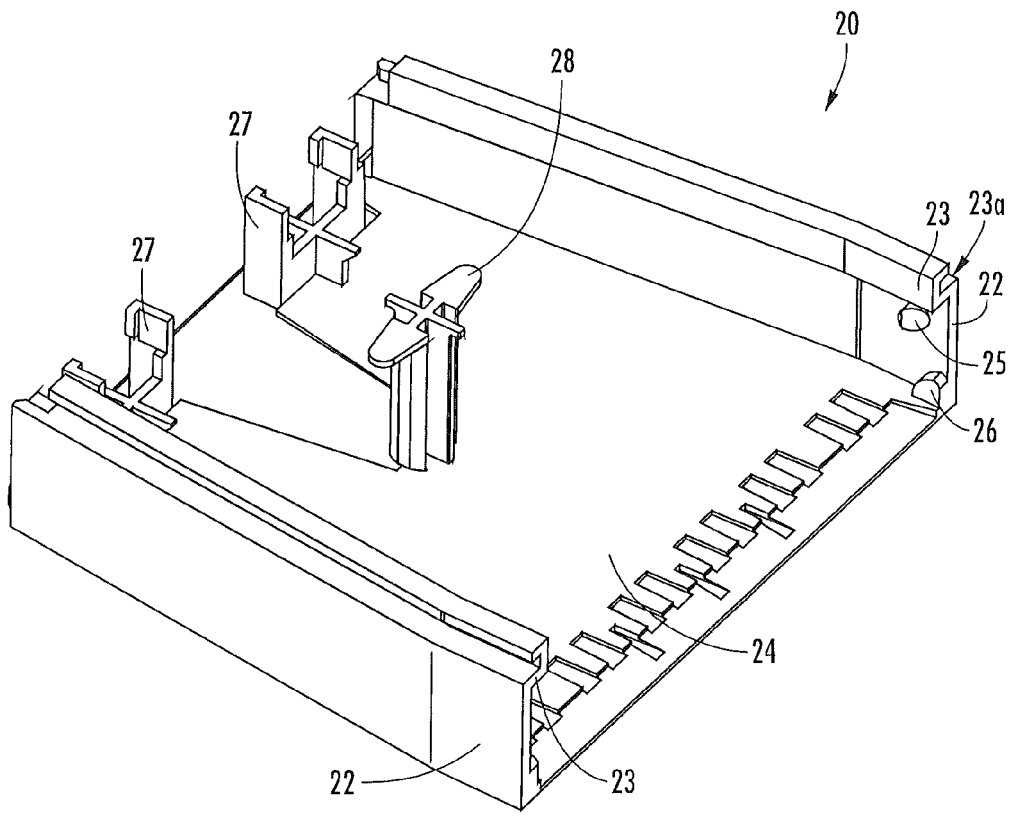
FIG. 2 is a perspective view of the housing of the module of FIG. 1.

Referring now to FIG. 2, the housing 20 includes a floor 24 and two opposed side walls 22. Each of the side walls 22 has an inwardly-offset inverted L-shaped lip 23 at its upper edge that forms an outwardly-facing slot 23a. A central projection 28 extends upwardly from the center of the floor 24, and two MPO adapter holders 27 extend upwardly from the rear portion of the floor 24.

Figure 2A:
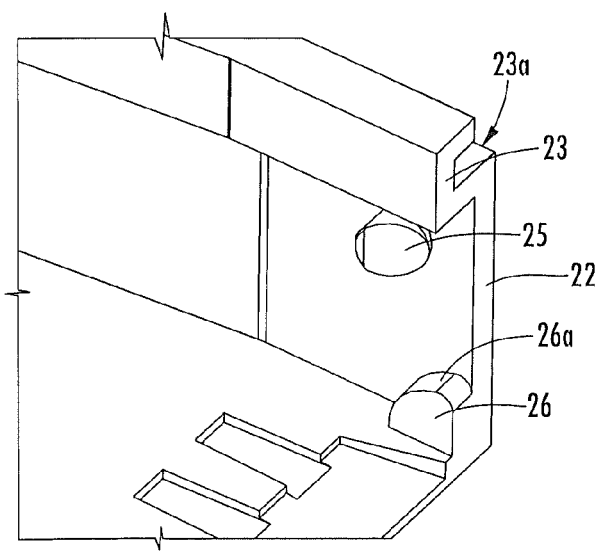
FIG. 2A is an enlarged perspective view of a portion of a side wall of the housing of FIG. 2.

Referring now to FIG. 2A, a short post 25 extends inwardly from a front portion of each side wall 22. The end of the post 25 is beveled, such that the post 25 is shorter in front and longer in back. In addition, a capture stub 26 having an arcuate surface 26a is located at the front edge of the joint between the floor 24 and each side wall 22. The arcuate surface 26a defines generally a "quarter-circle" profile that defines an axis A that extends between the captures stubs 26 on either side of the housing 20 (see FIG. 6).

Figure 3:
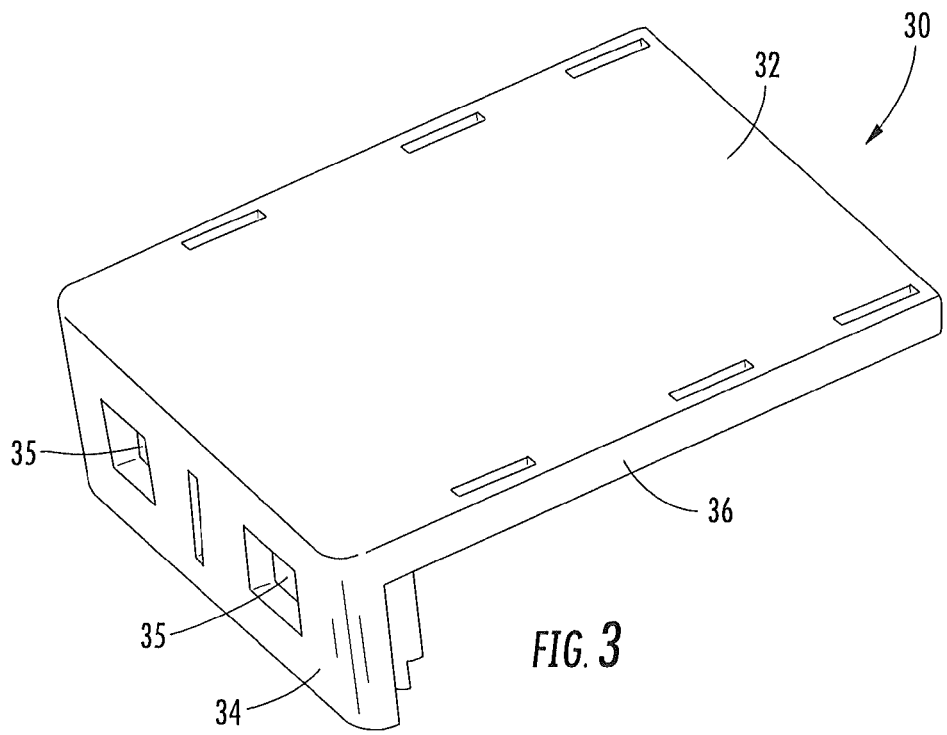
FIG. 3 is a top perspective view of the cover of the module of FIG. 1.
Figure 4:
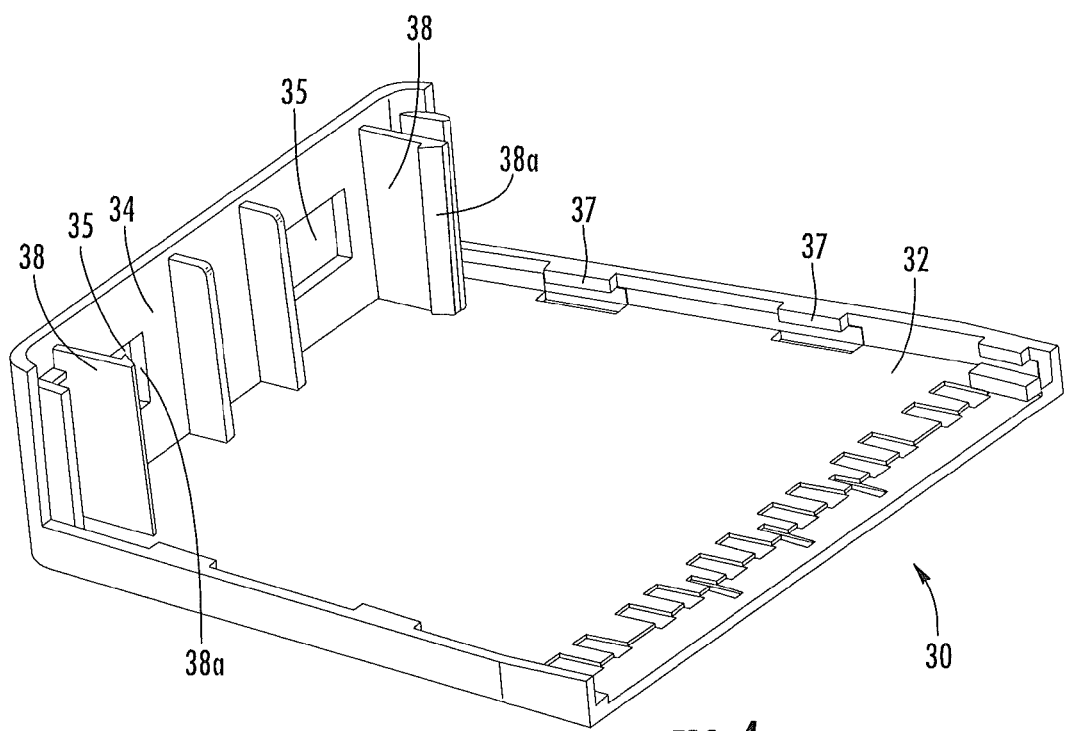
FIG. 4 is a bottom perspective view of the cover of FIG. 3.

Referring now to FIGS. 3 and 4, the cover 30 has a ceiling 32, a rear wall 34, and two very short opposed side walls 36. The side walls 36 include multiple inwardly-extending fingers 37. The rear wall 34 includes two apertures 35 for MPO adapters. Also, latches 38 with inwardly-extending hooks 38a extend forwardly from the rear wall 34.

Figure 5:
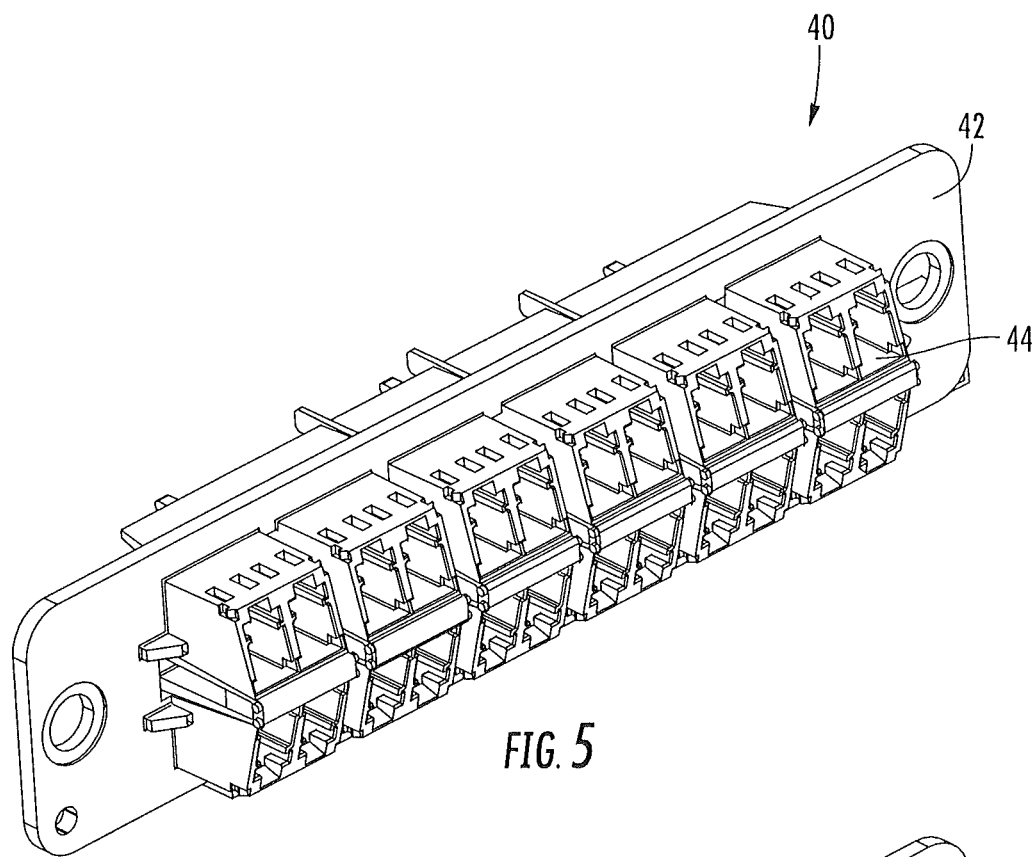
FIG. 5 is a front perspective view of the bezel of the module of FIG. 1.
Figure 5A:
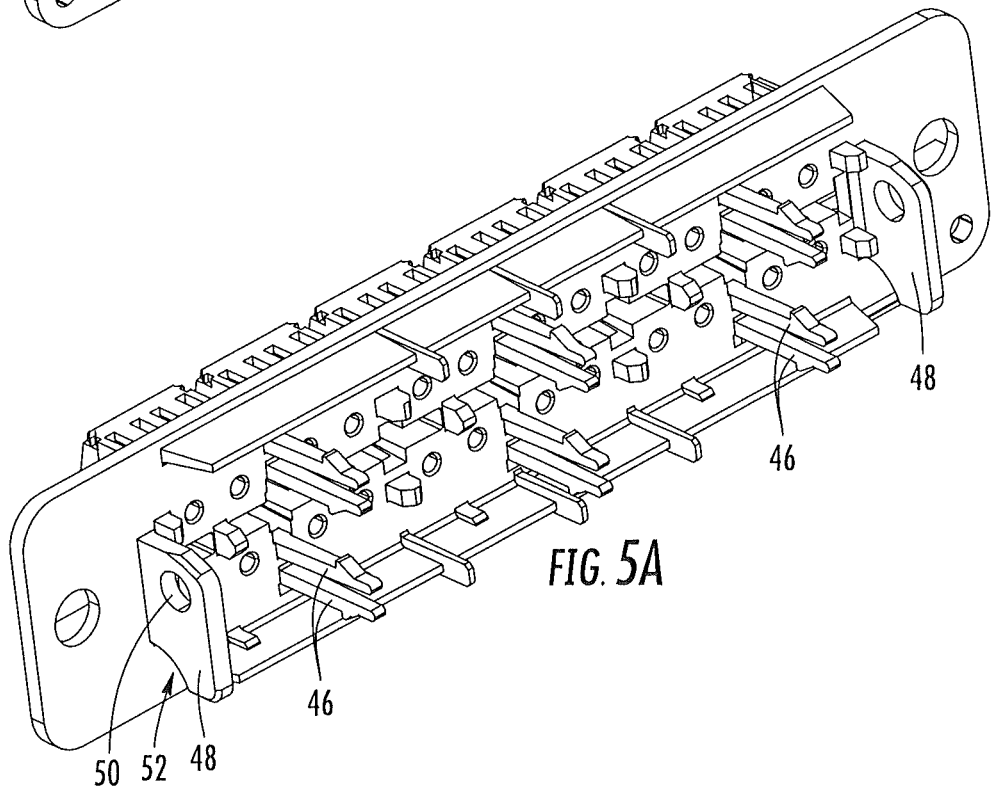
FIG. 5A is a rear perspective view of the bezel of FIG. 5.

Referring now to FIG. 5, the bezel 40 has a main panel 42 or other main body from which a plurality of chambers 44 extend forwardly. Pairs of latches 46 extend rearwardly from the main panel 42. Also, near each end of the bezel 40 a latch panel 48 or other projection extends rearwardly. Each latch panel 48 has an aperture 50 near its upper, rear corner, and also has a cutout area or recess 52 in its front, lower corner recessed from the lower edge of the latch panel 48.

Figure 6:
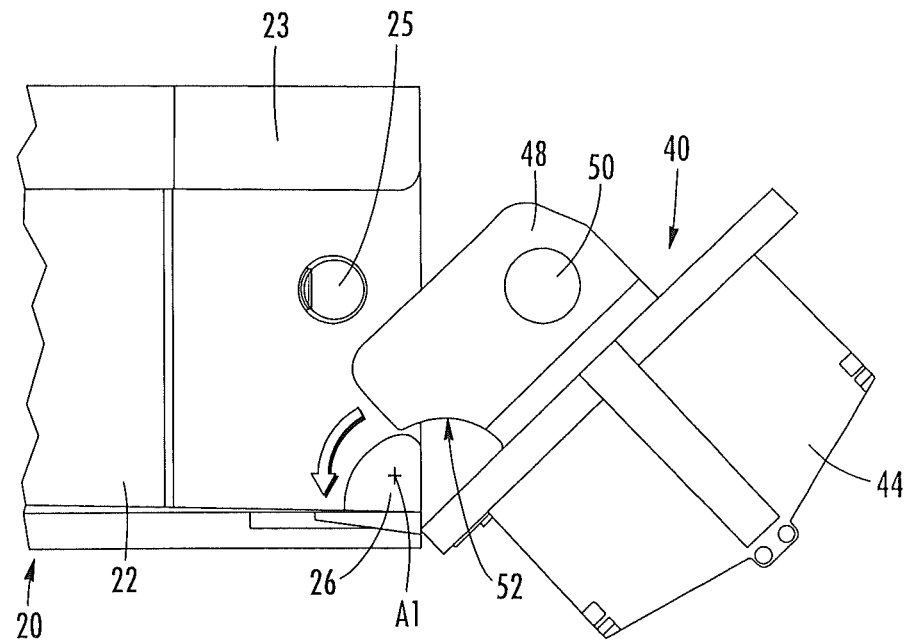
FIG. 6 is an enlarged internal side view of the bezel and housing side wall as the bezel approaches the side wall during assembly.
Figure 7:
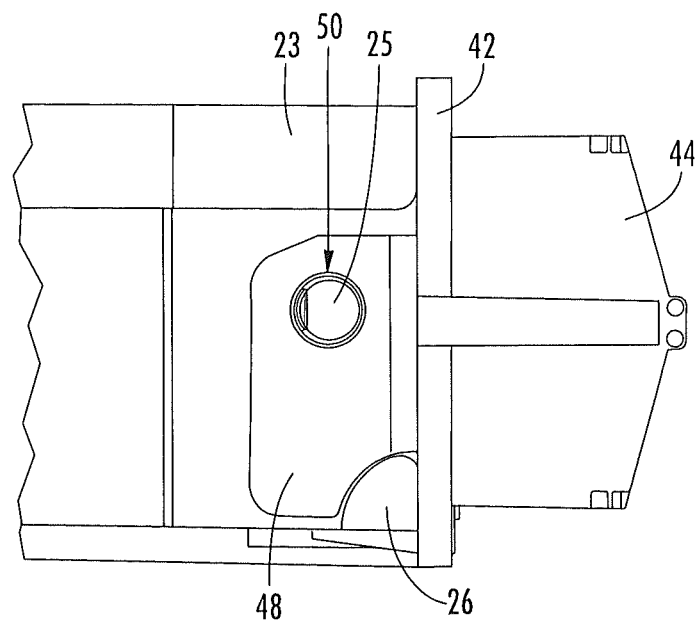
FIG. 7 is an enlarged side view as in FIG. 6 in which the bezel has been snapped into place with the housing.
Figure 8:
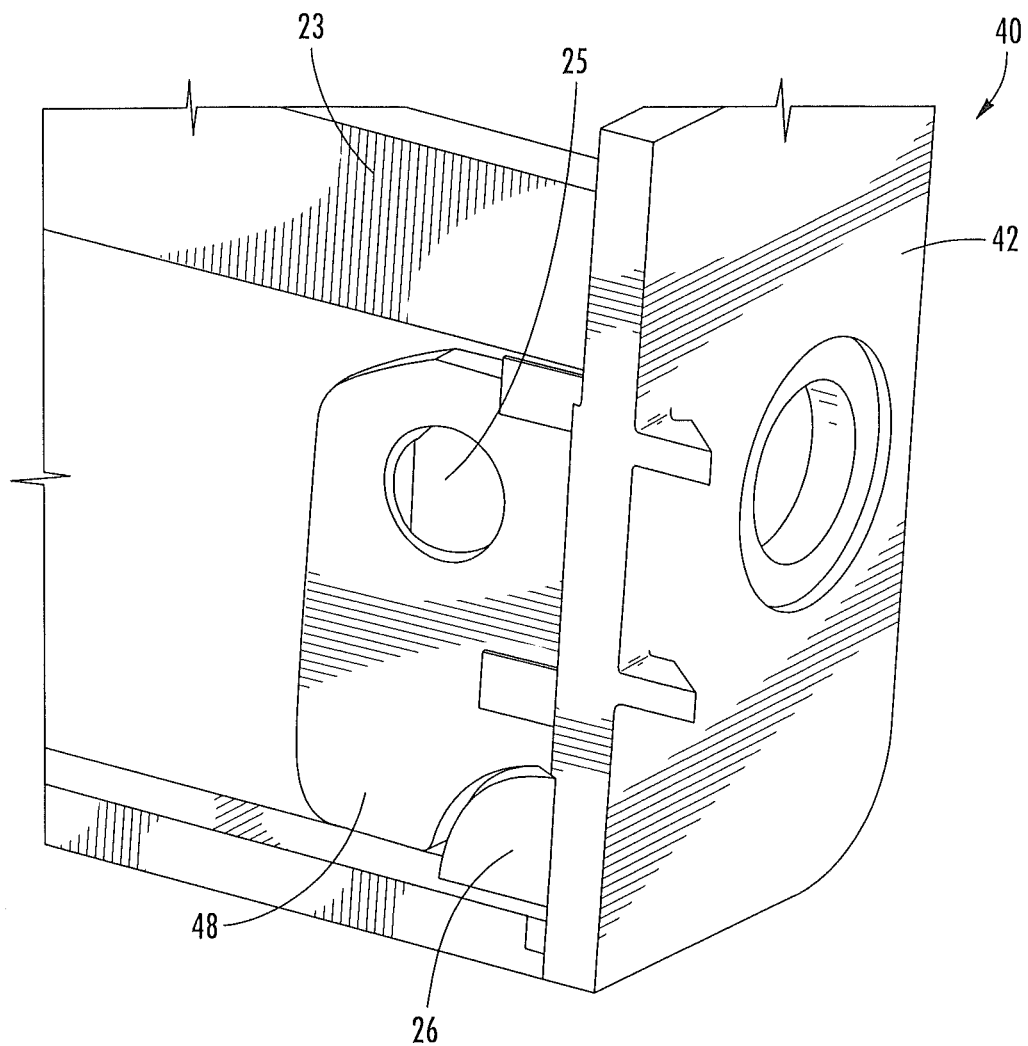
FIG. 8 is a perspective view of portions of the assembled bezel and housing as in FIG. 7.

As can be seen in FIGS. 6 and 7, the bezel 40 can be attached to the housing 20 by tilting the bezel 40 relative to the housing 20. As can be seen in FIG. 6, the lower edge of the latch panel 48 of the bezel 40 is positioned above the projection 26. The bezel 40 can then be rotated so that the upper edge of the latch panel 48 fits below the lip 23 of the side wall 22. As the latch panel 48 moves into the space below the lip 23, the rear edge of the latch panel 48 contacts the post 25 and forces it outwardly (aided by the beveled surface on the end of the post 25), thereby causing the side wall 22 to flex outwardly. Once the latch panel 48 moves rearwardly a sufficient distance that the aperture 50 reaches the post 25, the post 25 is received in the aperture 25 and the side wall 22 recovers from its flexed state. As shown in FIGS. 7 and 8, when the post 25 is received in the aperture 50, the projection 26 of the housing 20 is also received in the recess 52 of the latch panel 48, with the arcuate surface 26a confronting the recess 52, thereby securing the bezel 40 in place.

It should be understood that, in order to dissemble the bezel 40 and housing 20, it is necessary for the post 25 to move outwardly relative to the latch panel 48. In order for this movement to occur, the side walls 22 must flex outwardly. This characteristic of the latching mechanism will become important for the reasons described below.

Once the bezel 40 and housing 20 are assembled, the cover 30 can be attached thereto. The cover 30 is attached by positioning the cover 30 rearwardly of the housing/bezel assembly (FIG. 9), aligning the fingers 37 of the side walls 36 with the slots 23a of the lips 23 of the housing 20, then sliding the cover 30 forward until the hooks 38a of the latches 38 on the cover 30 clear the MPO adapter holders 27 of the housing 20 (FIG. 9A). At this point the cover 30 is firmly secured to the housing 20 by both the latches 38 and the interaction between the fingers 37 and the lips 23 of the housing 20. The housing 20, bezel 40 and cover 30 form an overall casing 60 (FIG. 10), in which the apertures 35 align with the MPO adapter holders 27.

This configuration prevents removal of the bezel 40 from the casing 60 without first removing the cover 30 from the housing 20. The bezel 40 cannot be removed first because the side walls 22 must be able to flex outwardly in order for the post 25 disengage from the aperture 50, and the side walls 22 are prevented from significant outward flexure by the presence of the side walls 36 outside of the lips 23. Removal of the cover 30 requires the destruction of the latches 38 that interact with the MPO adapter holders 27 and/or marring the exterior of the cover 30. Also, if one or more anti-tamper labels were affixed on the seam between the cover 30 and the housing 20, such labels would be torn if the cover 30 were removed. (Other anti-tampering features, such as spot welds or the like, may also be employed). The assembled casing 60 has no external latches that one can use to force the casing 60 open. Thus, any opening of the module 10 can be detected.

Referring back to FIG. 1, the internal components of the module 10 include optical fibers 12 that are connected with MPO adapters 14. The MPO adapters 14 are mounted in the MPO adapter holders 27. At their opposite ends, the fibers 12 are attached to one of a plurality of caps 16, each of which is mounted in one of the chambers 44 of the bezel 40. Dust caps 18 fit into the front side of the chambers 44. The fibers 12 can be looped around the central projection 28 to maintain an acceptable bend radius.

Assembly of the module 10 can be carried out by first connecting the fibers 12 with the MPO adapters 14 and the caps 16. The MPO adapters 14 may then be mounted in the MPO adapter holders 27 and the caps 16 mounted in the chambers 44 of the bezel 40 via the latches 46. The bezel 40 is then snapped to the housing 20 in the manner illustrated in FIGS. 6-8. (Alternatively, the bezel may be snapped into the housing 20 prior to the attachment of the caps 16 to the bezel 40, and/or the MPO adapters 14 may be mounted in the MPO adapter holders 27 prior to the attachment of the bezel 40 to the housing 20. The cover 30 can then be slid onto the housing 20 so that the fingers 37 fit within the slots 23a and the latches 38 engage the MPO adapter holders 27 (FIGS. 9 and 9A). The resulting module 10 is compact, secure and tamper-resistant.

Each of the housing 20, cover 30 and bezel 40 may be formed as monolithic structures and may comprise a polymeric material. Exemplary materials include polycarbonate, ABD and polyethylene. In particular, the housing 20 should be formed of a material that enables the side walls 22 to deflect during the assembly of the housing 20 with the bezel 40.

Those skilled in this art will appreciate that other forms and embodiments of the invention may be employed. For example, although the housing 20 is illustrated with a beveled post 25, the post may lack a beveled surface. Alternatively, the capture stub 26a may have a different shape, may be positioned such that it is adjacent the floor 24 but does not merge with the floor 24, and/or may be omitted in some embodiments. The lips 23 may be omitted in certain embodiments. More or fewer MPO adapter holders 27 may be employed. Also, the relative positions of the capture stubs 26 and the posts 25 may vary.

As other examples, the cover 30 may have more or fewer fingers 37 that fit in the slots 23a. The number of apertures 35 may also vary depending on the number of MPO adapter holders 27. Moreover, the latches 38 may vary in configuration, or may latch to a different structure on the housing 20. The rear wall 34 may be configured such that it is adjacent, but not rearward of, the rear edge of the housing floor 24.

As further examples, the bezel 40 may have more or fewer chambers 44 and/or latches 46. The latch panels 48 may take the form of a differently-configured rearward projection. The locations of the recess 52 and/or the aperture 50 may vary depending on the locations of the capture stub 26 and the post 25. The relative location of the main body 42 may change, such that it is adjacent, but not in front of, the front edge of the floor 24 of the housing 20. Other variations of the housing 20, the cover 30 and the bezel 40 may also be employed.

Moreover, the latch configuration may be suitable for connecting components other than those of a telecommunications module.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as recited in the claims. The invention is defined by the following claims, with equivalents of the claims to be included therein.

That which is claimed is:

1. An enclosure for a telecommunications system, comprising:
   a housing member with a floor and opposed side walls that merge with the floor, each of the side walls having a post that extends inwardly and an upper lip with an outwardly-facing slot;
   a bezel with a main body and a pair of rearwardly-extending projections, each of the rearwardly-extending projections having an aperture that receives a respective post of the housing member side walls, wherein the main body is positioned adjacent a forward edge of the housing floor; and
   a cover having a ceiling, a rear wall and opposed side walls, each of the opposed side walls having at least one inwardly-extending finger received in a respective slot of one of the housing member side walls, wherein the rear wall is positioned adjacent a rear edge of the housing floor.

2. The enclosure defined in claim 1, wherein each of the housing member side walls has an inwardly-extending capture stub adjacent the floor, and wherein each of the bezel projections includes a recess in a lower edge thereof that receives a respective one of the capture stubs.

3. The enclosure defined in claim 2, wherein each of the capture stubs of the housing includes an arcuate surface that confronts the recess of a respective bezel projection.

4. The enclosure defined in claim 1, wherein the housing includes an upwardly-extending member, and wherein the cover includes at least one forwardly-extending latch member that engages the upwardly-extending member of the housing.

5. The enclosure defined in claim 4, wherein the upwardly-extending member comprises a holder for a MPO adapter.

6. The enclosure defined in claim 5, wherein the cover rear wall includes an apertures that aligns with the MPO adapter holder.

7. The enclosure defined in claim 1, wherein the bezel front wall includes a plurality of chambers.

8. The enclosure defined in claim 1, further comprising an anti-tamper feature affixed to the housing and the cover.

9. The enclosure defined in claim 1, wherein the lips of the housing side walls are inwardly offset, and wherein the projections of the bezel, the capture stubs of the housing, and the lips are configured such that assembly of the housing and bezel comprises rotation of the bezel relative to the housing about an axis defined by the capture stubs.

10. The enclosure defined in claim 1, wherein an inward end of each post is beveled.

11. The enclosure defined in claim 1, wherein the post is upward and rearward of the capture stub.

12. The enclosure defined in claim 1, wherein, when assembled, the main body of the bezel is adjacent a front edge of the housing floor.

13. A telecommunications module, comprising:
   (a) an enclosure for a telecommunications system, comprising:
      a housing member with a floor and opposed side walls that merge with the floor, each of the side walls having a post that extends inwardly and an upper lip with an outwardly-facing slot;
      a bezel with a main body and a pair of rearwardly-extending projections, each of the rearwardly-extending projections having an aperture that receives a respective post of the housing member side walls, wherein the main body is positioned adjacent a forward edge of the housing floor; and
      a cover having a ceiling, a rear wall and opposed side walls, each of the opposed side walls having at least one inwardly-extending finger received in a respective slot of one of the housing member side walls, wherein the rear wall is positioned adjacent a rear edge of the housing floor;
   (b) an MPO adapter mounted in the housing;

(c) a plurality of optical fibers attached to the MPO adapter; and
(d) a plurality of caps mounted in the bezels and attached to respective optical fibers.

* * * * *